March 18, 1952 — B. WILCOX — 2,589,466
PRODUCTION OF TITANIUM TETRACHLORIDE
Filed March 6, 1950

INVENTOR.
Barnard Wilcox
BY Greek Wells
Atty.

March 18, 1952  B. WILCOX  2,589,466
PRODUCTION OF TITANIUM TETRACHLORIDE
Filed March 6, 1950  2 SHEETS—SHEET 2
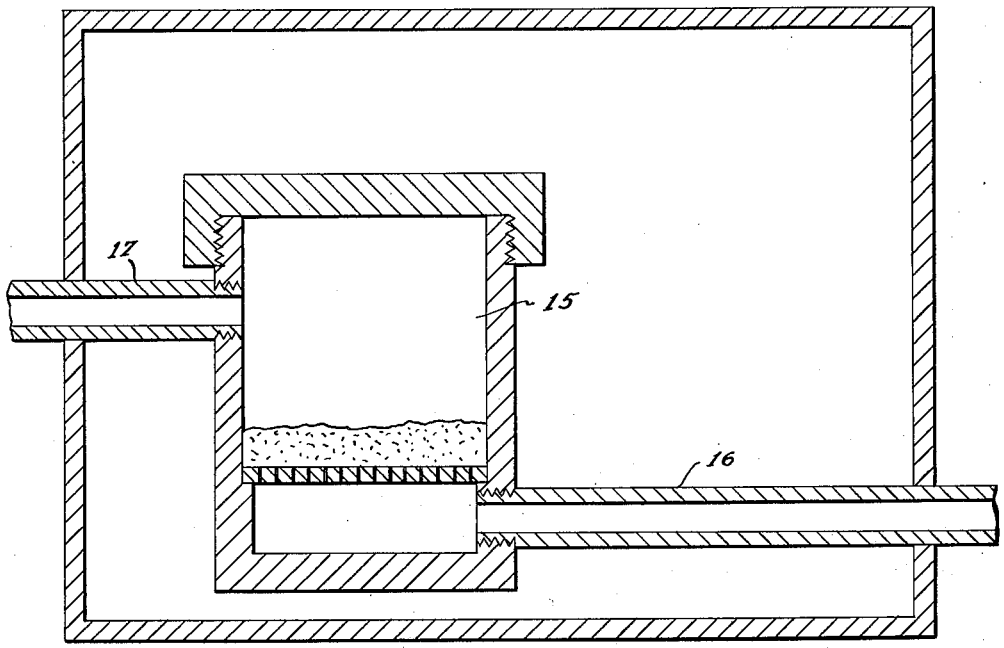
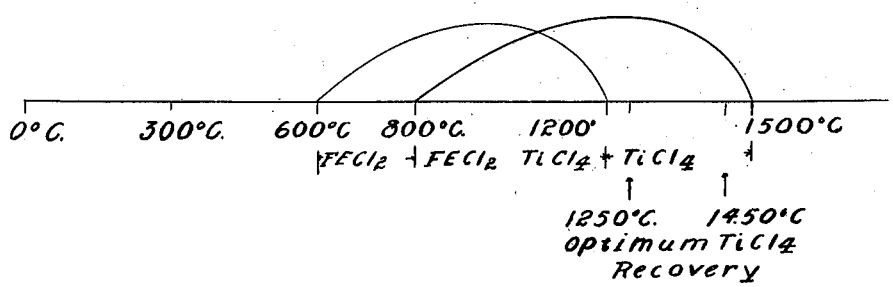
INVENTOR.
Barnard Wilcox
BY
Fred Wells
Atty Patented Mar. 18, 1952

2,589,466

UNITED STATES PATENT OFFICE 2,589,466

PRODUCTION OF TITANIUM TETRACHLORIDE

Barnard Wilcox, Wallace, Idaho

Application March 6, 1950, Serial No. 147,851

5 Claims. (Cl. 23—87)

The present invention relates to the treatment of metallic oxides of titanium and iron as are characteristic of the ores known as ilmenite ($FeTiO_3$) also written ($FeO.TiO_2$) and has for its principal purpose the production of titanium tetrachloride ($TiCl_4$) therefrom in substantially pure form. This application is a continuation in part of my application, Serial No. 690,613, filed August 16, 1946 and abandoned in favor of this application after this application was filed.

Prior processes of this type have been concerned with the separation of the iron and titanium compounds by the chlorination of iron, which may or may not have been first reduced by carbon or other suitable reducing agent, and the ferric chloride ($FeCl_3$) and ferrous chloride ($FeCl_2$) thus formed are then separated from the titanium oxide ($TiO$) or titanium dioxide ($TiO_2$) residue; or by the simultaneous chlorination of the iron and titanium in the presence of a carbonaceous reducing agent and the recovery of the chlorides of these materials in gaseous form. In the first of these processes, the ferric chloride must be recovered at a temperature between 600 and 800 degrees C. because above these temperatures the chlorine becomes active to the titanium present, but at this temperature the ferric chloride formed is inclined to form a gummy solid which clogs the apparatus and makes further processing extremely difficult. Experience has shown that only about 97% of the iron can be removed by this system. Therefore 3% or more of the iron is left in with the titanium residue to interfere with the formation and purification of the titanium product and to discolor this product. In the latter of these processes the iron chloride and the titanium tetrachloride are formed and recovered simultaneously in gaseous form at temperatures ranging from 600 degrees C. to 1150 degrees C., but difficulty is experienced in effecting the separation of the iron and the titanium compounds. Here again the iron chloride forms a gummy mass and later in the process it forms residues which are difficult and costly to handle. Several successive chemical separation steps are necessary before the last traces of the iron chloride can be removed from the titanium tetrachloride. In both of the above types of processes it can be readily seen that the titanium compound must be given extensive further treatment before it can be utilized.

I have discovered that titanium tetrachloride may be produced in substantially pure form in a direct manner, that is, by converting the titanium present in the ilmenite into titanium tetrachloride ($TiCl_4$) and without allowing any iron present in the ilmenite to become so converted or chlorinated. I have invented a method by which titanium tetrachloride can be obtained substantially free from iron chloride compound from mixtures of these metals such as occur naturally in the form of ilmenite. My invention comprises separately heating the ilmenite and the chlorine to temperatures in the range between 1250 degrees and 1450 degrees centigrade and maintaining them within this range of temperatures while the chlorine and ilmenite are brought together for reaction with each other. I find that, when the pre-heated ilmenite and chlorine are brought together and maintained in this temperature range while they react, the titanium makes a very rapid and complete reaction in combining with the chlorine present; but the iron compounds present in the ilmenite do not react or combine with the chlorine at these high temperatures. I find that iron practically ceases to react with chlorine at 1200 degrees centigrade. I can however, combine chlorine and titanium up to temperatures of 1500 degrees centigrade. In the range 1250 degrees centigrade to 1450 degrees centigrade, a relatively high rate of reaction between the titanium and chlorine takes place. No iron chloride compounds are formed at this temperature which compounds would then volatilize off from the reaction along with the titanium tetrachloride vapors and cause considerable trouble in trying to obtain a separation of these two types of compounds.

In accordance with the invention the oxides of titanium and iron, of which ilmenite is a typical example, are brought in any suitable manner to a temperature in the order of not less than 1250 degrees centigrade and not more than 1500 degrees centigrade and are then subjected to the action of a chlorination agent such as chlorine or hydrogen chloride gas, which gas has been preheated also to a temperature within the range from 1250 to 1500 degrees centigrade. At these temperatures the iron and the chlorine do not unite, the iron remaining as a solid or liquid compound residue while the titanium is converted into titanium tetrachloride which, at these temperatures, is a stable gas, and may be removed in a simple manner without clogging or gumming. An additional advantage rises in the use of this process from the fact that no appreciable amount of the chlorinating agent is wasted in the formation of iron chlorides which have relatively little value on the commercial market as compared with the cost of the chlorinating agent used, thereby effecting a saving in cost of operation.

The accompanying drawings illustrate, somewhat diagrammatically, suitable equipment for carrying out my invention. In the drawings:

Figure 3 is a diagrammatic view of another furnace for carrying out the invention; and Figure 4 is a graph showing the relation of the reaction zones of iron and titanium with chlorine.

Figure 1:
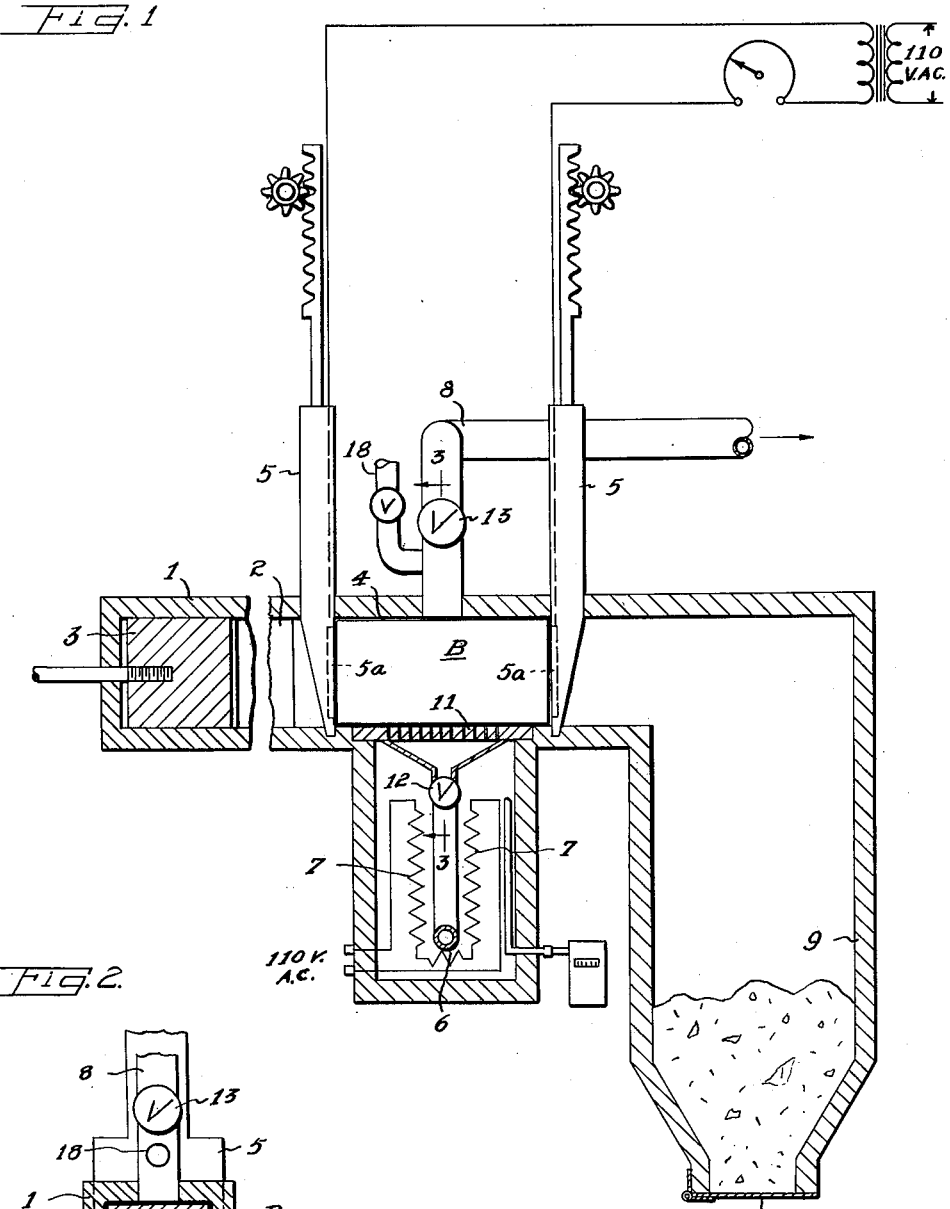
Figure 1 is a sectional view through one form of treating furnace wherein means are provided for carrying out the invention.
Figure 2:
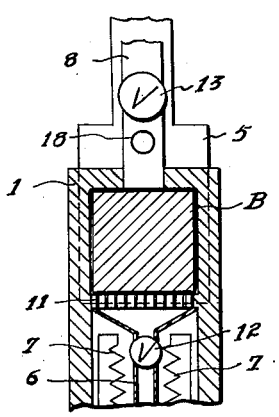
Figure 2 is a sectional view taken on the line 2—2 of Figure 1.

One method by which this process may be carried out is diagrammatically illustrated by Figures 1 and 2 of the accompanying drawings. In these figures the numeral 1 designates a monolithic refractory casing from which the furnace chamber is made. The numeral 2 designates the opening into which a preheated briquette may be inserted by hand, or by a suitable mechanism. The numeral 3 designates a graphite plunger which is capable of moving back and forth in the chamber and pushing the briquette B into chamber 4 when two gates 5 are raised. When the gates 5 are lowered they act by reason of their wedge shape to press electrodes 5a against the ends of the briquette and make contact sufficiently that an electric current can be passed through the briquette and thereby heat the briquette by reason of its internal resistance. The briquette is finally heated to the desired working temperature of 1250 degrees centigrade in the chamber 4 before any gas is introduced. The numeral 6 designates the chlorine inlet tube and 7 the electrical elements that are used for preheating this tube and thereby the chlorine before its entrance into the reaction chamber. The numeral 8 designates the titanium tetrachloride discharge tube; 9 the waste hopper and 10 the discharge trap from whence the refuse material is removed. An inlet grid 11 of graphite spreads the gas as it enters the chamber 4 from the tube 6. Valves 12 and 13 control the tubes 6 and 8.

The briquettes are pressed in a cylinder under quite high pressure. They are made of a mixture of approximately 8 parts of ore to one part of pulverized coal or the equivalent in coke, oil, tar or other reducing agent and 7 part of molasses or other binder. Care has to be taken in pressing these briquettes to a close tolerance in length so that they fit well between the electrodes 5a in the reaction chamber 4. They should be preheated and "heat soaked" at a temperature of approximately 700 degrees centigrade in order to gain rigidity and strength whereby they can be handled. The briquettes may be placed directly into the furnace at this temperature.

This same process may be carried out in any other suitable form of pyrometallurgical equipment. For instance I have carried it out in a small replica of a shaft-type furnace illustrated in Figure 3 of the drawings. The essential parts of the necessary equipment are a closed reaction chamber 15 with a chlorine inlet tube 16 and a product outlet tube 17. Means of any suitable type are provided for introducing ore and carbon mixtures in the chamber 15 after they are preheated to a temperature exceeding the critical minimum temperature of 1250 degrees centigrade, and a refuse discharging means must be provided whereby the refuse material may be extracted from the reaction chamber and completely segregated and protected from exposure to the chlorine gas after this material has been fully chlorinated and before the temperature of this material be allowed to drop below the same minimum critical temperature of 1250 degrees centigrade.

The following examples which I have carried out will illustrate the practice of the invention:

*Example I.*—Finely ground ilmenite mixed with 4% by weight of powdered charcoal was heated in a closed container having one chlorine inlet tube at the bottom and one gas outlet tube emerging from the top of a chamber such as the chamber 15. The gas outlet tube 17 was connected to a condensing apparatus outside the furnace and the condensed liquids allowed to drip into a flask. The closed container 15 and the chlorine inlet tube 16 were then heated first to 1250 degrees centigrade and then to 1300 degrees centigrade. Chlorine gas was then allowed to flow through the inlet tube and into the reaction chamber. Pure white fumes of titanium tetrachloride were then evolved and collected. When tested it was found to be over 99% $TiCl_4$ and no iron was detected. After five minutes of time during which titanium tetrachloride was evolved the flow of chlorine gas was stopped. The temperature of the apparatus was allowed to drop to 1000 degrees centigrade and the chlorine again turned on. Almost instantly voluminous brown and reddish-brown fumes of iron chloride were evolved. This proved that by the chlorination of iron-titanium bearing materials such as ilmenite at 1250 degrees centigrade to 1300 degrees centigrade titanium tetrachloride could be obtained substantially free from iron chlorides.

*Example II.*—A mixture of ilmenite ore in a minus 60 mesh state was mixed with 12.5% carbon in the form of pulverized coal and 12.5% molasses used as a binder. These materials, mixed intimately, were then compressed in the shape of cylindrical briquettes subject to 5 tons per square inch pressure and preheated to about 500 degrees centigrade. These briquettes then were individually passed into the briquette entrance chamber of a chlorinating apparatus such as is shown in Figures 1 and 2 of the drawings. The electric current was then applied and controlled until the briquette was brought up to the operating temperature of 1300 degrees centigrade. The chlorine gas inlet tube was then preheated to the desired temperature, 1350 degrees centigrade. When the chloride gas was turned on and allowed to enter into the reaction chamber pure white and voluminous fumes were emitted, which fumes when condensed and tested were found to be over 99% pure titanium tetrachloride. These fumes when caught and condensed into liquid were substantially colorless titanium tetrachloride, the desired product.

*Example III.*—A mixture of ilmenite in minus 100 mesh state was mixed with 10% carbon in the form of charcoal and 10% molasses used as a binder. These materials were then intimately mixed and briquetted. Upon heat treating they stood up as well and showed the same strength as those using more carbon and binder in the form of molasses. These briquettes were then tested in the chlorination apparatus shown in Figures 1 and 2 with the result that they were treated just as easily as those in Example II above.

In every instance care was taken, and must always be taken, to prevent the chlorine and ore from reacting at temperatures below 1250 degrees centigrade while the reaction chamber is open to the passage by which the titanium tetrachloride is removed. This is accomplished in Figures 1 and 2 by closing the valve 13 as soon as the titanium-chlorine reaction is complete.

and flushing out the chlorine in the reaction chamber 4 before bringing in a new briquette to heat up. The chamber 4 is cleared out by injecting an inert gas, such as $CO_2$, through an inlet 18 into the chamber after the chlorine is turned off, and until a new briquette is inserted and heated, then closing the inlet 18 only after the gates 5 are closed.

The graph shown in Figure 4 will illustrate roughly the temperature zones in which the reactions of iron and titanium with chlorine take place. The zone between 1250 degrees centigrade and 1450 degrees centigrade produces efficient reaction between the titanium and chlorine but is above the reaction zone of iron with chlorine. By keeping chlorine away from the ore in the reaction chamber 4 until a temperature of 1250 degrees centigrade is reached in the chamber and separately recovering the gases produced during the reaction at 1250 degrees centigrade to 1500 degrees centigrade, I am able to obtain titanium tetrachloride separate from the iron chlorides.

Having thus described my invention, I claim:

1. The process of removing titanium as titanium tetrachloride from ilmenite ore which comprises heating the ore to a temperature above 1250 degrees C. but below 1500 degrees C., separately heating chlorine to a temperature above 1250 degrees C. but below 1500 degrees C. then bringing the chlorine and ore together in a reaction chamber and maintaining the temperature thereof during reaction in the range between 1250 degrees C. and 1500 degrees C. and drawing off the gaseous products of reaction from the solid residue while the residue is within said temperature range, thereby selectively removing the titanium component of the ore as titanium tetrachloride in the effluent state from the solid residue and leaving the iron component of the ore unchlorinated in the solid residue until the drawn off gaseous products containing the titanium tetrachloride are separated from the solid residue.

2. The process of removing titanium as titanium tetrachloride from ilmenite ore which comprises adding to the ore about 4% to 12% by weight of carbon then heating the mixture of ore and carbon to a temperature above 1250 degrees C. but below 1500 degrees C., separately heating chlorine to a temperature above 1250 degrees C. but below 1500 degrees C. then bringing the chlorine and ore together in a reaction chamber and maintaining the temperature thereof during reaction in the range between 1250 degrees C. and 1500 degrees C. and drawing off the gaseous products of reaction from the solid residue while the residue is within said temperature range, thereby selectively removing the titanium component of the ore as titanium tetrachloride in the effluent state from the solid residue and leaving the iron component of the ore unchlorinated in the solid residue until the drawn off gaseous products containing the titanium chloride are separated from the solid residue.

3. The process of treating metallic oxides composed principally of titanium and iron to separate the titanium from the iron which comprises heating the oxides to a temperature in the range of 1250 degrees C. to 1500 degrees C., heating a gaseous chlorinating agent to a temperature in the range of 1250 degrees C. to 1500 degrees C., then bringing the oxides together with the gaseous chlorinating agent while both are in the aforesaid temperature range, removing the gaseous products formed by the reaction of the agent with the oxide of titanium from the solid residue while both the gaseous products and the residue are within said temperature range, and thereby selectively removing the titanium content of the oxides as titanium tetrachloride in the effluent state from the solid residue and leaving the iron component of the oxides unchlorinated in the solid residue until the drawn off gaseous products containing the titanium tetrachloride are separated from the solid residue, then subsequently cooling the removed gaseous products out of contact with the residue.

4. The process of removing titanium as titanium tetrachloride from ores containing iron and titanium compounds which comprises bringing the ore to a temperature in the range of 1250 degrees C. to 1500 degrees C., separately bringing a chlorinating agent to a temperature in the range of 1250 degrees C. to 1500 degrees C., reacting the ore with the chlorinating agent in the aforesaid temperature range and separating the gaseous products of the reaction from the solid residue before cooling either the gaseous products or the residue, thereby selectively removing the titanium component of the ore as titanium tetrachloride in the effluent state from the solid residue and leaving the iron component of the ore unchlorinated in the solid residue until the drawn off gaseous products containing the titanium tetrachloride are separated from the solid residue.

5. The process of removing titanium as titanium tetrachloride from ores containing iron-titanium compounds which comprises briquetting the ore with finely divided carbon, then heating the briquetted ore-carbon mixture to at least 1250 degrees C. in a reaction chamber, then injecting chlorine gas into said reaction chamber at a temperature of at least 1250 degrees C. and maintaining the temperature in the chamber above 1250 degrees C. during the injection, drawing off the gaseous products from the chamber while the said gaseous products and the chamber are maintained above 1250 degrees C., thereby selectively removing the titanium content of the ore as titanium tetrachloride in the effluent state from the solid residue and leaving the iron component of the ore unchlorinated in the solid residue until the drawn off gaseous products containing the titanium tetrachloride are separated from the solid residue, and recovering titanium tetrachloride from the gaseous products.

BARNARD WILCOX.

REFERENCES CITED

The following references are of record in the file of this patent:

UNITED STATES PATENTS

| Number | Name | Date |
| --- | --- | --- |
| 2,184,887 | Muskat et al. | Dec. 26, 1939 |

FOREIGN PATENTS

| Number | Country | Date |
| --- | --- | --- |
| 535,179 | Great Britain | Apr. 1, 1941 |
| 548,352 | Great Britain | Oct. 7, 1942 |
| 551,525 | Great Britain | Feb. 26, 1943 |
| 553,056 | Great Britain | May 6, 1943 |